United States Patent [19]  [11] 3,748,478
Jensen  [45] July 24, 1973

[54] METHOD AND APPARATUS FOR DETECTING A FAINT ENERGY SOURCE
[75] Inventor: Paul K. Jensen, Playa Del Rey, Calif.
[73] Assignee: SSR Instruments Co., Santa Monica, Calif.
[22] Filed: Dec. 15, 1971
[21] Appl. No.: 208,343

[52] U.S. Cl............. 250/207, 235/92 V, 250/217 R
[51] Int. Cl........ G06f 7/38, G06g 7/00, H01j 39/12
[58] Field of Search................ 250/207, 203, 217 R; 235/92 V

[56] References Cited
UNITED STATES PATENTS
3,398,285   8/1968   Sachs........................ 250/203 R X Primary Examiner—James W. Lawrence
Assistant Examiner—T. N. Grigsby
Attorney—Leonard Golove, Marvin H. Kleinberg et al.

[57] ABSTRACT

A deflectable image dissector tube is utilized as a detector of a "faint" radiation source by alternately "viewing" the source and an adjacent nonradiating area. The deflection circuits are driven by a relatively high-frequency clock for a predetermined interval. Any detected photons are stored in a pair of counters, respectively corresponding to the area being scanned, and at the end of the interval, the difference between the stored counts represents the "brightness" of the source.

16 Claims, 4 Drawing Figures

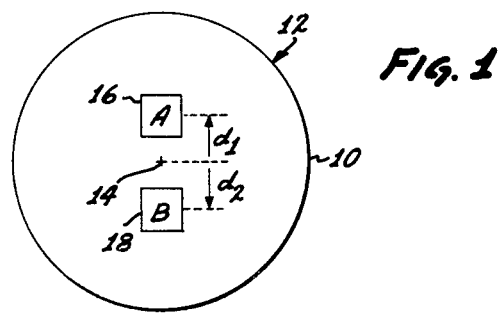
Fig. 1
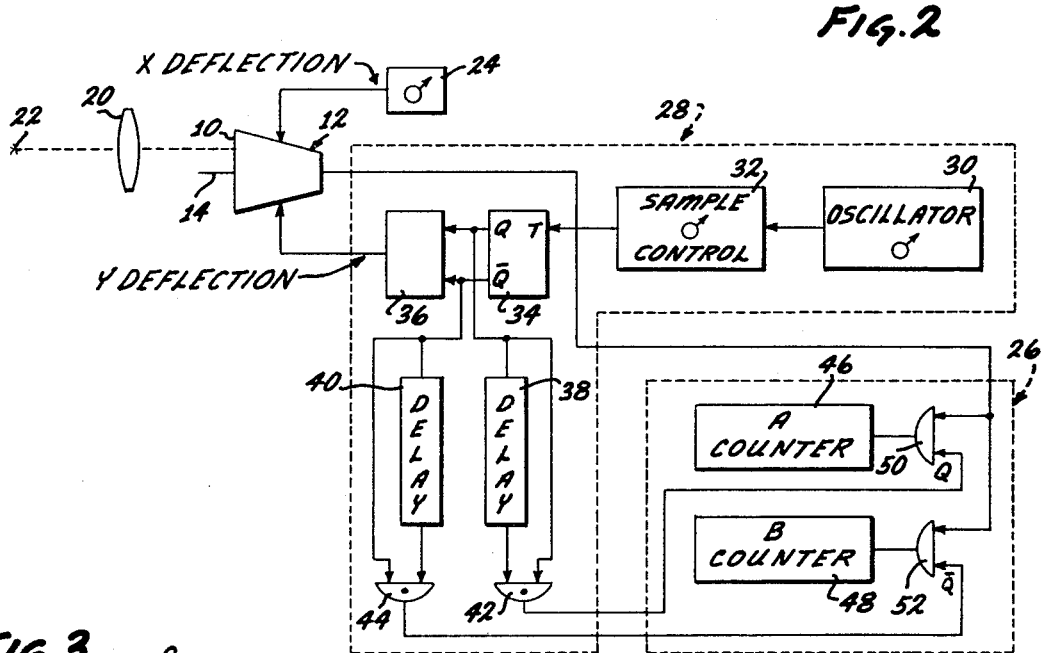
Fig. 2
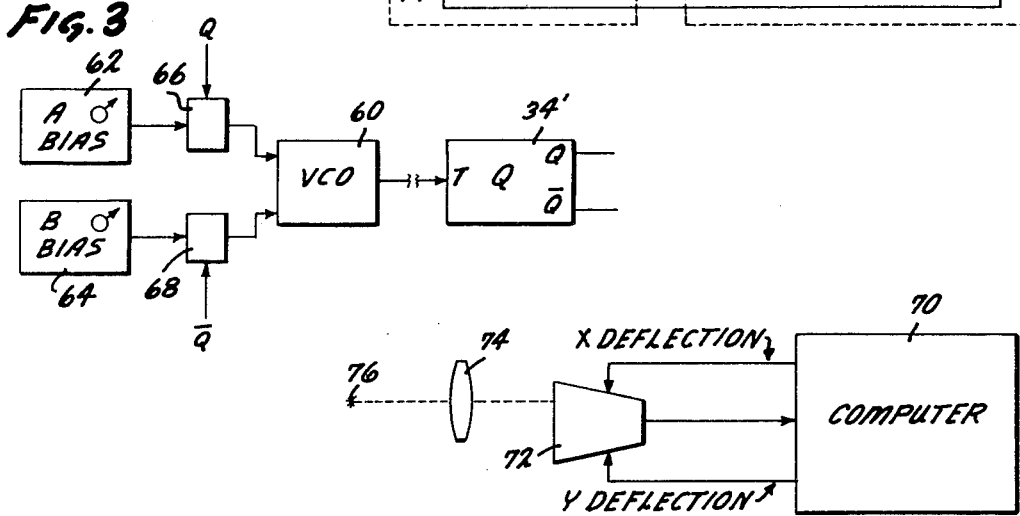
Fig. 3
Fig. 4

METHOD AND APPARATUS FOR DETECTING A FAINT ENERGY SOURCE

The present invention relates to the measurement of "faint" sources of radiation, and more particularly, to an improved method and apparatus for measuring the magnitude of a relatively faint radiation source in a "noisy" background.

In the prior art, relatively faint radiation sources have been detected and measured by utilizing a photomultiplier which attempted to count individual photons. The procedure generally followed was to aim the photomultiplier at the radiation source and measure incident radiation for a substantial period of time. The magnitude of the accumulated radiation was stored, either in a counter that recorded signals representing individual photons or, as a voltage level resulting from the integration of the signal output of the photomultiplier tube.

An adjacent area in space, which includes no radiation source was then scanned for a comparable interval and the magnitude of impinging radiation was also measured and stored. The difference in the two measurements then represented the magnitude of the source, since it was assumed that the background radiation and instrument noise was substantially constant and equal in both incremental areas being scanned, over the time of measurement.

In recent years, improved schemes have been employed, utilizing a photomultiplier in combination with an external chopper. In one embodiment, the chopper alternately admits and excludes radiation. This scheme tended to compensate for "noise" within the counting circuit, and assumed little or no noise in the background radiation. Accordingly, the "chopping" method was modified so that as to a mechanical chopper-scanner, the photomultiplier alternately "looks" at the radiant source and at an adjacent area not including the radiant source. The chopping technique also provides a signal which can be considered an A.C. signal that is more susceptible to manipulation by electronic techniques which permit amplification, modulation, and counting through synchronous techniques.

An inherent problem in the measurement techniques described above, rests in the fundamental assumption that the background radiation remains substantially constant throughout the entire measurement, which is a safe assumption when dealing with relatively "bright" radiant sources. However, when working at low levels of radiation, where samples must be taken over a substantial period of time and where the background radiation can be substantial compared to the magnitude of the source, any variation in the background radiation can disturb the measurement of the magnitude of the source.

It is therefore deemed desirable to utilize a chopping technique at a relatively high frequency wherein the scanned interval is relatively brief, although, over a period of time, substantially half of the observation is of the source and half is of an area not including the source.

Mechanical and electro-mechanical choppers are limited in the frequency that can be obtained and if an optical system is employed to alternately scan adjacent incremental areas, some radiation loss is encountered in the optical system. Therefore, it has been found desirable to simplify the radiation gathering structure as much as possible.

Deflectable light sensors such as image dissector tubes have been in use for many years which include a photo cathode and deflecting circuitry which enables any incremental area of the photo cathode to be "scanned." Image dissectors can include deflectable photomultiplier tubes such as are described in the patent to John R. Clark, U.S. Pat. No. 3,149,235, issued Sept. 15, 1964.

Similar devices are described in the patent to Frank Blitzer, et al., U.S. Pat. No. 3,320,423, issued May 16, 1967. These references disclose image dissector photomultiplier tubes which are inherently suited to photon counting. There are also commercially available, photomultiplier tubes from ITT, under the series designation FW-130, which have been available for some time and whose operating parameters and reliability are well known and documented.

It has been discovered that such an image dissector and photomultiplier can be used in a mode wherein two selected incremental areas of the photo cathode can be alternately scanned. If the tube is aligned with an optical system such that a radiant source from a spatial area impinges upon one of the incremental areas of the photo cathode and an adjacent spatial area lacking a radiation source impinges upon the other incremental area of the photo cathode, the deflecting circuitry can be utilized to alternately examine the two photo cathode areas at a rate that can be greatly in excess of the chopping rates achievable using electromechanical choppers and without any of the problems introduced by the use of electromechanical components, such as friction, inertia, vibration, and the like.

An adjustable oscillator can generate any chopping frequency and the same circuitry can be employed to gate the photomultiplier output into appropriate counting and storage circuits. With an all electronic system, it is simple to utilize digital techniques to count and store, in separate counters, signals representing the radiant input to each of the incremental areas of the photo cathode. Further, computer techniques enable the period during which an observation is made to be as short or as long as the investigator desires, while switching between the two photo cathode areas at fairly high repetition rates.

In a preferred embodiment of the present invention, an FW-130 photomultiplier tube is utilized in combination with an oscillator and frequency dividing circuits so that a number of frequency ranges for scanning can be selected. The oscillator is used to drive the deflection circuitry which, in the preferred embodiment, scans incremental areas that are equally displaced on opposite sides on the optical axis of the tube. The signals that control the deflection circuits are also used, after a limited delay, to gate photo multiplier signals into a pair of counters respectively corresponding to the incremental area of photo cathode being scanned.

At the conclusion of an observation, the contents of a counter representing the "dark" area are subtracted from the contents of the counter corresponding to the radiant source and the difference represents the magnitude of the radiant source.

In alternative embodiments, the accuracy of the system can be improved by "calibrating" the system based on the actual parameters of a particular photomultiplier tube. For example, prior to a measurement, the tube can be calibrated by first excluding light from both incremental areas of the photo cathode and permitting the system to operate for a very long interval. The relative counting efficiency of the incremental areas of the photo cathode can be determined and subsequent observations can be corrected.

Alternatively, the photo cathode can be exposed to a highly collimated source of a radiation over a very long interval to determine any difference in the counting efficiency of the photo cathode. Upon the conclusion of such a calibration experiment, it is possible to correct for any differences in the efficiency of the photo cathode.

In yet another embodiment, the counting efficiency of the photo cathode is determined as above, and a voltage controlled oscillator can be utilized in combination with an adjustable bias source so that the incremental time interval of scan can be modified. For example, if there is a 1 percent difference in the counting efficiency of the two incremental areas of the photo cathode, then the frequency of the clock during the scan of one area would differ from the frequency of the clock during the scan of the other area by the one percent. Differently stated, the period of scan of the more efficient area would be shortened relative to the period of scan of the less efficient area, by the amount of difference in efficiency.

In yet another embodiment, if a digital computer is available with substantial memory capacity, then the entire photo cathode can be "mapped" and the relative efficiency of each and every incremental area can be noted and "remembered." That is, for every "X-Y" location of the photo cathode, a quantity, representing the counting efficiency of that area, can be stored. In use, the X-Y location of the two selected incremental areas can be utilized to automatically modify the scan interval for each incremental area to correct for any differences in counting efficiency. Alternatively, two incremental areas of the photo cathode can be selected which have identical counting efficiencies.

It is therefore an object of the present invention to provide an improved synchronous radiation detector for low light level sources by employing a deflectable photo detector and electronically "chopping" as between the source and an area of the background without the source.

It is yet an alternative object of the invention to utilize high speed electronic switching and digital counting techniques to measure the magnitude of a low level radiation source in a "noisy" background.

It is yet an additional object of the invention to improve the efficiency of an image dissecting photomultiplier by determining the counting efficiency of different incremental areas of the photo cathode and to compensate for such differences in counting efficiency in the results.

It is an additional object of the invention to utilize an image dissecting photomultiplier for low level light detection and to account for differences in the counting efficiency of different incremental areas of the photo cathode by providing unequal scan intervals for each incremental area to compensate for such differences in counting efficiency.

It is yet another object of the invention to provide an improved low level light detection system in which an image dissecting photomultiplier is calibrated by "mapping" the entire photo cathode to determine the counting efficiency of each incremental area of photo cathode and by utilizing the results of such mapping to compensate for any actual measurements made in any given incremental area of the photo cathode.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is an idealized front view of the photo cathode of an image dissector photomultiplier suitable for use in the present invention;

FIG. 2 is an idealized system block diagram of a low level light detector system according to the present invention;

FIG. 3 is a block diagram of a correcting circuit useful in the present invention to compensate for variations in counting efficiency of various areas of photo cathode; and FIG. 4 is a block diagram of an alternative embodiment of the present invention, employing a digital computer to control the image dissecting photomultiplier and to record and process the acquired data.

Turning first to FIG. 1, there is shown a face plate, photo cathode 10 of an image dissecting photo multiplier such as one of the FW-130 series of photo multipliers produced by ITT. An image dissecting photo multiplier 12 has an optical axis 14 represented by the cross symbol at the center of the face plate 10. A first incremental area of photo cathode A 16 and a second incremental area B 18 are disposed on opposite sides of the axis 14, and, in the preferred embodiment, are equally displaced therefrom by the respective distances $d1$ and $d2$.

Assuming that the photo cathode 10 can be defined by an orthogonal coordinate system centered at the optical axis 14, and further assuming that, as illustrated, the horizontal and vertical axes are the X and Y axes, which intersect at the optical axis 14, respectively, then the incremental area A 16 would be located at $X=0$, $Y=d_1$ and the incremental area B 18 would be located at $X=0$, $Y=-d_2=-d_1$. Electronic deflecting circuitry would then be employed to alternately direct electrons generated at area A 16 and area B 18 to the image aperture, representing the input to the photo multiplier portion of the tube.

Turning next to FIG. 2, the image dissector photomultiplier 12 is shown in combination with an optical system 20 and a remote radiant source 22. As shown, the optical system 20 directs the image of the remote radiant source 22 to a point on the photo cathode 10 corresponding, in this example, to the incremental area A 16.

It may be safely assumed that no radiant source exists in the area of space that the optical system 20 images on the area B 18 of the photo cathode 10. An adjustable X-deflecting network 24 is connected to the X deflection circuits of the photomultiplier tube 12. Once the X location is determined, it is generally not modified during the course of an observation. The signal output of the photomultiplier tube 12 is applied to a counter storage system 26, which is controlled by an electronic chopping system 28.

The electronic chopping system 28 includes an adjustable oscillator 30 which generates a signal at a frequency which, in the broadest aspects of the present invention, would range from D.C. to 500 KHz. The frequency range, to a great extent, depends upon the sensitivity of the photo cathode 10 and the intensity of the background radiation present in that spatial volume being scanned, which does not include the radiant source 22. A sample control block 32 is provided, which may be a timing circuit, that adjustably determines the time interval over which a complete measurement will be taken. The sample control block 32 could include a settable counter which is driven by the oscillator 30. When a predetermined count has been reached, the clock signals could then be cut off from the rest of the circuit. The counting techniques to accomplish this are well known.

The output of the sample control block 32 is applied to a triggerable flip-flop 34, the outputs of which are applied to a Y deflection block 36. The Y deflection block 36 is arranged so that with a first output of the flip-flop 34, a first magnitude of bias signal is applied to the Y deflecting circuits. With the other flip-flop 34 output energized, an equal but oppositely polarized bias signal is applied to the Y deflecting circuits. In alternate states of flip-flop 34, the Y deflection circuits are driven by a bias corresponding to equal but opposite displacement in the Y direction from the optical axis 14.

The outputs of the flip-flop 34 are respectively applied to delay networks 38 and 40. The output of the delays 38, 40 are combined in and gates 42, 44, respectively, with the undelayed outputs of the flip-flop 34 so that appropriate gating signals can be provided to the counter storage system 26. Effectively, the output of the photomultiplier 12 is applied to a counter only during a limited interval which commences after the bias has been changed. The output is supplied to the same counter until the state of the flip-flop 34 changes.

The counter storage system 26 includes a first or an A counter 46 that corresponds to and counts the output of the photomultiplier 12 representing the radiation impinging upon the incremental A area 16 of the photo cathode 10. Similarly, a second or B counter 48 stores a count representing the radiation impinging on the B area 18 of the photo cathode 10.

The output of the photomultiplier tube 12 is applied to a pair of gates 50, 52, respectively, coupled to the A and B counters 46, 48. The A gate 50 is enabled by the gating signal derived from the first output of the flip-flop 34 and the B gate 52 is enabled by an output derived from the alternative output of the flip-flop 34. It will then be seen that as the state of the flip-flop 34 changes, the A counter 46 and B counter 48 are alternately enabled, corresponding to the switching of the scan of the face plate from the A area 16 to the B area 18.

In operation, a faint radiant source 22 is directed to, for example, the A area 16, at the chopping frequency selected by the oscillator 30. A sampling interval is also selected and it is set into the sample control block 32. The output of the oscillator 30 is then applied to the triggerable flip-flop 34 which responds to the oscillator output by converting a sinusoid into a square wave. The two output terminals of the flip-flop 34 are alternately energized and the Y deflection block 36 alternately directs emitted electrons from the A area 16 and the B area 18 to the entrance aperture of the photomultiplier 12.

When a "photon" is detected at the photo cathode 10, in the incremental area being "scanned" by the Y deflection circuits, the liberated photo electrons are directed through the aperture into the photomultiplier and an output pulse is provided by the tube 12. This output pulse is directed to the counter storage system 26. If the A area 16 is being "scanned" and the interval represented by the associated delay 38 has elapsed, that pulse will be transmitted through the A gate 50 and will register as a count in the A counter 46. Similarly, an output pulse of the tube 12 which occurs while scanning the B area 18, will be stored in the B counter 48.

After the predetermined observation interval has elapsed, the sample control block 32 cuts off the clock from the flip-flop 34 and the contents of the A and B counters 46, 48, can be noted. In the simplest embodiment of the invention, the stored counts of the counters 46, 48 can be read and subtracted. The difference represents the magnitude of the remote radiant source 22. Because of the chopping techniques, it is assumed that the contents of the B counter 48 exclusively represent the noise component that is included in the count stored in the A counter 46.

Because of the inhomogeneities in the construction of a device such as a photomultiplier having a photo cathode, it is possible to "calibrate" the tube in advance of any measurement. This calibration can be accomplished by using the circuits of FIG. 2 in conjunction with either a highly collimated source of light of known intensity in place of the radiant source 22 or in the absence of any radiation whatsoever.

If either condition is permitted to persist over a very long observation interval, any differences in magnitude of the stored counts would represent a differential counting efficiency of the corresponding incremental area of the photo cathode. When such a calibration has been undertaken, it is possible to mathematically correct the results of an observation of a real source. It is also possible to compensate for such differences electronically by providing a correcting circuit.

Turning next to FIG. 3, there is illustrated a circuit suitable for compensating for differential counting efficiencies of various incremental areas of a photo cathode. If a first incremental photo cathode area has a counting efficiency that differs from a second incremental area by an amount that can be expressed in a percentage, then it is possible to adjust the relative scan interval alloted to each incremental area to compensate for the difference in efficiency.

As shown in FIG. 3, a voltage controlled oscillator 60 is utilized as the basic clock for chopping and counter selection.

A first or A adjustable bias source 62 is provided as well as a second or B adjustable bias source 64. The output of the VCO 60 after signal conditioning is ultimately applied to a Q flip-flop 34' which selects the Y deflection bias and the counter to be utilized. A pair of suitable gates including an A bias gate 66, a B bias gate 68, is interposed between the A and B bias sources 62, 64 and the VCO 60. The A and B gates 66, 68, are respectively controlled by the output of the flip-flop 34' and are alternately energized so that only one bias is applied to the VCO in any instant of time.

If a B area of the cathode has a counting efficiency that differs from an A area by, for example, one percent, then different biases can be applied to the VCO 60 during the A and B scans. The effective scanning interval alloted to the more efficient incremental area can be reduced or the scan interval alloted to be less efficient incremental area can be increased to offset the effects of the differential counting efficiency.

It will be seen that if the frequency of the VCO 60 is increased, the scan interval is reduced, while if the frequency is decreased, the scan interval is extended. It is therefore possible, during a calibration run, to adjust the biases so that with equal radiation impinging upon the two incremental areas of the photo cathode, the counts stored in the counters will be equal to within whatever error limits are acceptable. Alternatively, if a radiation source of known magnitude is applied to one of the incremental areas, the VCO biases can be adjusted so that the count representing that known radiation magnitude will be found in the appropriate counter at the end of a test observation.

Thus far, it has been shown that an image dissector photomultiplier can be recalibrated for predetermined incremental areas of the photo cathode. Since virtually all commercially available tubes are made to manufacturing tolerances, there can be a variation of counting efficiency over the entire photo cathode. It may be desirable to "map" the entire photo cathode so that for each X-Y location, the relative counting efficiency can be determined.

Alternatively, areas of the photo cathode can be selected which have substantially identical counting efficiency for use in the embodiments of the present invention. However, such a mapping process is most efficiently performed with the aid of a digital computer having a substantial memory capacity. Moreover, to utilize effectively the results of such a mapping, it would be desirable to be able to switch or "chop" as between one X-Y location and a second X-Y location, similar to the manner described above in connection with FIG. 2, which was limited to switching Y deflections only.

Accordingly, as shown in FIG. 4, a digital computer 70 is connected to an image dissector photomultiplier 72. The computer 70 receives, as an input from the tube 72, a signal representing the impingement of a photon on that incremental area of the photo cathode which has been addressed by the computer 70 driven X and Y deflection circuits.

As shown, an optical system 74 directs the image of a remote radiant source 76 to the desired area of the photo cathode of the tube. Adjacent volumes of space, not containing a radiant source, impinges upon the remainder of the photo cathode.

As taught above, the digital computer 70 can include the necessary clock circuits which determine the chopping rate. Further, the computer 70 has the necessary counters and arithmetic circuits to subtract the contents of one counter from the other to determine the magnitude of the impinging radiation. The digital computer 70 also includes the necessary gating and delaying circuits to determine the scanning interval to be provided for each incremental area of the photo cathode, to compensate for differences in the counting efficiency of each incremental area.

It is also within the skill of the art and the capability of present day digital computers to maintain, in memory, a figure of merit or counter efficiency for each coordinate location of the photo cathode is addressed by the X and Y deflection circuitry, that quantity can be recalled from memory to extend or shorten the scanning interval allocated to that incremental area. Adjusting the scanning interval compensates for any differences in counting efficiency as between selected areas of the photo cathode.

Thus there has been shown and described, in several embodiments, an improved method and apparatus for the synchronous detection of extremely low level signals. An image dissector photomultiplier can be utilized as photon detector and a remote radiant source is imaged on one incremental area of the photo cathode of such a photomultiplier. An adjacent incremental area can be selected as having no radiant image directed thereto, and a suitable clock or oscillator circuit can be utilizes to scan alternately the two incremental areas. The photomultiplier output corresponding to each area can be stored in respective counters.

The frequency of the chopping or switching can determine the interval of time alloted for each scanning interval, and an overall observation time can be selected, during which the results are to be accumulated. At the end of such an observation interval, the difference of the contents of the counters represent the magnitude of the remote radiant source.

In alternative embodiments, the incremental areas of the photo cathodes that are selected for use in observation can be calibrated for counting efficiency, either with a light source of known magnitude or a "dark" environment. If the calibration interval is sufficiently long, any differences in counting efficiency can be noted by the contents of the counters. This difference figure can be used to adjust any results.

In other alternative embodiments, any differences in counting efficiencies in the incremental areas of the photo cathode can be automatically compensated for by modifying the time available for the scan of each incremental area. That is, if the counting efficiency differs by three percent, the frequency of a chopping can be differentially adjusted so that either the less efficient area of photo cathode is provided with a longer scan interval or the more efficient area is provided with a shorter scan interval.

In yet another embodiment, a digital computer is utilized to mechanize the entire operation. The computer can in the presence of either dark radiation or radiation of known intensity, "map" the entire photo cathode and assigned to each address a figure corresponding to counting efficiency. The, in use, when any particular area of the photo cathode, the stored quantity could be utilized to modify the time alloted for the scan of that interval.

It is to be understood that the techniques taught herein can be adapted for use with any deflectable photo sensor. Further, the photon counting technique is not essential although it has been found to be preferable in these applications. Other photo detecting schemes can be employed with the techniques of the present invention with comparable results.

The techniques of the present invention are equally applicable to the detection and measurement of any faint radiation source, whether the location is known or unknown. For example, a known but faint source of electromagnetic radiation can be measured utilizing the present invention if an electronically controlled antenna array is employed. The antenna then "looks" at the source and an adjacent spatial volume, alternately, in much the same fashion as the deflectable photo sensors described hereinabove.

It is also possible, with the present invention, to "discover" faint sources of radiation without changing the apparatus or techniques involved. This can be accomplished by scanning with the detector in a predetermined search pattern and, at each point in the pattern, alternately "looking" at two separated spatial volumes. For example, if an optical detector is employed, the detector can be programmed to start a scan at some $-X,Y$ position assuming $X=0$, $Y=0$ at the optical axis. Alternately, the detector looks at areas displaced from the horizontal (X-axis) by distances $y$ and $y-\Delta y$. The scan can then be a conventional raster scan or may be any of the other scans which are well known in the art, such as the rosette.

What is claimed as new is:

1. Apparatus for detecting a relatively faint energy source in a noisy background comprising in combination:
   a. detector means having a predetermined field of view, including electronic means for selecting any portion of said field of view, said detector means generating an output signal in response to energy applied from a remote faint source to the selected portion;
   b. control means coupled to said detector means and said electronic means for alternatively selecting a first portion of said field of view and a second portion of said field of view; and
   c. comparing means coupled to said detector means and said control means for providing a resultant signal representative of the difference between the output signal of said first selected portion and said second selected portion, said resultant signal potentially representing the presence of a remote, relatively faint energy source within one of said selected portions of said field of view, depending upon the sign and magnitude of said resultant signal.

2. Apparatus as in claim 1, above, wherein said control means alternatively selects the portions of said field of view at a rate ranging from 100 Hz to 500 KHz.

3. Apparatus as in claim 1, above, adapted to detect and measure the magnitude of a relatively faint radiant energy source, wherein said detector means include
   deflectable optical detector means having a photosensitive area for generating a signal in response to applied radiant energy from a remote radiant faint source impinging upon a selected portion of said photosensitive area, selectable by deflector driving means;
   means for directing said detector means relative to a remote spatial volume, including a remote radiant faint source;
   said control means including deflector driving means coupled to said detector means for alternatively selecting the portion of said photosensitive area aligned to receive energy from the remote faint source and a portion of said photosensitive area aligned to receive energy from a similar spatial volume lacking an energy source;
   said apparatus further comprising:
      storage means for holding detector output signals responding to the radiant source and detector output signals responding to the spatial volume lacking an energy source; and
   wherein said comparing means include
      means for subtracting said stored signals responding to the spatial volume lacking the energy source from stored signals responding to the remote radiant faint source, to provide said resultant signal representative of the magnitude of the energy received from faint radiant energy source.

4. Apparatus of claim 3, above, wherein said deflectable optical detector means include an image dissector tube; and
   said deflector driving means include switching means for alternately selecting first and second portions of said photosensitive areas respectively receiving energy from the radiant energy source and a nearby spatial volume lacking an energy source.

5. Apparatus as in claim 4, above, wherein said image dissector tube has an optical axis, said deflector driving means include deflecting circuits for selecting a portion of the photosensitive area to apply photoelectrons to a detecting assembly, and said means for directing aligns said optical axis with a spatial volume of predetermined extent including the remote radiant faint source.

6. Apparatus of claim 3, above, wherein said storage means include at least a pair of counting means, each responsive to applied signals of predetermined magnitude for recording a count therein, and said deflector driving means include gating means, coupled to said storage means, for applying detector output signals corresponding to the remote radiant faint source to a one of said pair of counting means, and detector output signals corresponding to the spatial volume area lacking an energy source to the other of said counting means.

7. Apparatus of claim 3, above, wherein said deflector driving means include adjustable oscillator means for selectively determining the scan interval allotted to each portion of said photosensitive area.

8. Apparatus of claim 7, above, wherein said adjustable oscillator means include a first adjustable bias means corresponding to a first photosensitive area portion and a second adjustable bias means corresponding to a second photosensitive area portion, and gating means coupling said first and second bias means to said adjustable oscillator means for applying said first and second bias means output to said oscillator means, said oscillator means operating at a first and second frequency, respectively corresponding to scans of the first and second photosensitive area portions, whereby differences in efficiency of the first and second portions can be equalized by an adjustment of the bias means controlling the scan interval allocated to each.

9. Apparatus for detecting a relatively faint energy source in a noisy background comprising in combination:
   a. detector means having a predetermined field of view, including means for selecting any portion of said field of view, said detector means generating an output signal in response to energy applied from a remote faint source to the selected portion;
   b. control means coupled to said detector means for alternatively selecting a first portion of said field of view and a second portion of said field of view; and
   c. timing means coupled to said control means for terminating an observation after a predetermined number of selections; and
   d. comparing means coupled to said detector means and said control means for providing a resultant signal representative of the difference between the output signal of said first selected portion and said second selected portion, said resultant signal potentially representing the presence of a remote, relatively faint energy source within one of said selected portions of said field of view, depending upon the sign and magnitude of said resultant signal.

10. A system for detecting the presence of a source of energy in a noisy background comprising:
radiant energy detector means having a given field of view;
electronic deflecting means for selecting a first section and a second section within said field of view at a selecting rate greater than 4 kHz.
means coupled to said detector means for detecting and signalling the energy level in said first section and said second section; and
means for comparing the output representative of said first section energy level and second section energy level to detect the presence of a source of energy in one of said field of view sections.

11. The system of claim 10, above, wherein said field of view is subdivided into two approximately equal sections for searching out suspected sources of energy.

12. A method for detecting a relatively faint energy source in a noisy background comprising the steps of:
alternately detecting the radiation emanating from nearby first and second spatial volumes, one of which includes the relatively faint energy source, at a switching rate ranging from 1 scan of each volume per second through 500,000 scans of each volume per second;
comparing the magnitudes of the signals detected in said first volume with the signals detected in said second volume between successive scans; and
accumulating and displaying the magnitude of the resultant signal and identifying the spatial volume corresponding thereto so that a resultant signal greater than a predetermined magnitude indicates a presence of a relatively faint energy source, and the sign of said signal indicates in which of said spatial volumes the energy source is found.

13. The method of claim 12, above, further including the step of accumulating and storing first signals representative of the radiation from said first spatial volume and second signals representative of the radiation from said second spatial volumes, and wherein the comparing step subtracts one of the accumulated signals from the other accumulated signals to produce said resultant signal.

14. The method of claim 13, above, further including a timing step for terminating an observation after a predetermined number of scans.

15. Apparatus for detecting a relatively faint energy source in a noisy background comprising in combination;
a. radiation detector means having a predetermined field of view, including electronic deflecting means for selecting any portion of said field of view, said detector means generating an output signal in response to energy applied from a remote faint source to the selected portion;
b. control means coupled to said detector means and said electronic deflecting for alternatively selecting a first portion of said field of view and a second portion of said field of view; and
c. comparing means coupled to said detector means and said control means for providing resultant signals representative of the output signals of said first selected portion and said second selected portion, said resultant signals potentially representing the presence of a remote, relatively faint energy source within the one of said selected portions of said field of view, corresponding to the greater resultant signal.

16. Apparatus for measuring the magnitude of a radiant energy source in a background comprising in combination:
a. detector means having a predetermined field of view, including electronic means for selecting any portion of said field of view, said detector means generating an output signal in response to radiant energy applied to the selected portion;
b. control means coupled to said detector means said electronic means for alternatively selecting a first portion of said field of view and a second portion of said field of view; and
c. comparing means coupled to said detector means and said control means for providing a resultant signal representative of the difference between the output signals corresponding to said first selected portion and said second selected portion; said resultant signal representing the magnitude of a radiant energy source within one of said selected portions of said field of view.

* * * * *